United States Patent [19]

Cody et al.

[11] Patent Number: 5,389,200
[45] Date of Patent: * Feb. 14, 1995

[54] PROCESS FOR REMOVING INORGANIC COMPONENTS THAT FORM ASH ON IGNITION AND OILY WASTE FROM PAPER DURING RECYCLING

[75] Inventors: Charles A. Cody, Robbinsville; Edward D. Magauran, Westampton, both of N.J.

[73] Assignee: Rheox, Inc., Hightstown, N.J.

[*] Notice: The portion of the term of this patent subsequent to Sep. 29, 2009 has been disclaimed.

[21] Appl. No.: 51,759

[22] Filed: Apr. 26, 1993

[51] Int. Cl.$^6$ .............................. D21C 5/02
[52] U.S. Cl. .............................. 162/5; 162/8
[58] Field of Search ............ 162/4, 5, 7, 8, DIG. 4, 162/199

[56] References Cited

U.S. PATENT DOCUMENTS

| | | | |
|---|---|---|---|
| 4,013,505 | 3/1977 | Balcar | 162/4 |
| 4,305,781 | 12/1981 | Langley et al. | 162/164.6 |
| 4,470,912 | 9/1984 | Beall | 210/691 |
| 4,650,590 | 3/1987 | Beall | 210/691 |
| 4,867,844 | 9/1989 | Dessauer | 162/135 |
| 4,935,096 | 6/1990 | Gallagher et al. | 162/5 |
| 5,130,028 | 7/1992 | Cody et al. | 210/691 |
| 5,151,155 | 9/1992 | Cody et al. | 162/5 |
| 5,176,831 | 1/1993 | Rowsell | 210/691 |

FOREIGN PATENT DOCUMENTS

| | | |
|---|---|---|
| 1006190 | 1/1989 | Japan . |
| 4202879 | 7/1992 | Japan . |

*Primary Examiner*—Karen M. Hastings
*Attorney, Agent, or Firm*—Michael J. Cronin

[57] ABSTRACT

A process for treating wastepaper to remove oily waste and inorganic components, which comprises: (a) forming an organoclay treating composition in a wastepaper aqueous system; (b) contacting the wastepaper aqueous system with an amount of the organoclay effective to remove from the wastepaper oily waste and inorganic components; and (c) recovering paper pulp from the aqueous system. The process is effective in wastepaper treatment systems using both air flotation removal as well as systems utilizing water-washing processes.

32 Claims, No Drawings

PROCESS FOR REMOVING INORGANIC COMPONENTS THAT FORM ASH ON IGNITION AND OILY WASTE FROM PAPER DURING RECYCLING

BACKGROUND OF THE INVENTION

The invention described herein relates to a process of removing clay and filler, and other inorganic components which upon ignition constitute ash, as well as oily wastes, from a pulp of wastepaper in an aqueous system that then may be utilized to make new paper products. The invention is particularly directed to a process of collecting such inorganic components and oily waste by means of a novel treatment agent which is an organo-clay.

DESCRIPTION OF THE PRIOR ART

This invention relates to research which is described in U.S. Pat. No. 5,151,155 and in presently co-pending U.S. patent application, now U.S. Pat. No. 5,336,372.

Wastepaper has in the past been sporadically utilized as a source of material for new paper mostly of low grade and quality. In light of growing environmental concerns, including an expanding body of statutory law and regulation, paper makers are under current pressure to increase the utilization of recycling of wastepaper for all types of new paper. In addition the quality of such paper has become increasingly important particularly for high grade paper and paper board products.

While many researchers have focused their concern on the removal of ink from previously used paper as part of the recycling process, another major concern is removal of the many other chemicals contained in paper. Coating clays and filler clays are two of the most common ingredients used in many high grade papers.

Non-cellulose coatings, filler clay and other products are added during paper manufacture or deposited on paper surfaces during processing or applied to paper in converting or printing operations to enhance a number of different appearance characteristics. These characteristics include smoothness, printability, gloss, durability and paper protection. The range of formulation of the various materials varies greatly depending on the intended function of the paper, resulting in a variety of what then become contaminants in conventional wastepaper recycling processes. These can range from simple filler clay particles to tenacious chemicals and pigmemts. The amount of this material can vary from 1% to as high as 50% of the overall weight of the wastepaper.

Even within a given type category of wastepaper there can be a significant variation in the type and amount of clays and other materials. These non-ink components, after ignition of the paper, are commonly referred to as ash content. For example, in some types of newsprint, ash content is less than 1%, and there is no intentional addition of clays to enhance desired properties. In some paper types a small amount of talc may be used in production to help control pitch deposits. Titanium dioxide may be added to improve gloss and color. In better quality newsprint addition of 5% clay and other materials by overall weight is common and in some cases much more.

The term ash when used in reference to paper has a particular meaning and refers to the inorganic residue left after a sample of paper pulp is burned at elevated temperature. The temperature selected is dependent on the type of sample being analyzed for ash content. For example, for wood and pulp samples, Tappi method T-211 om-85 stipulates 575° C. For paper and paperboard, Tappi method T-413 om-85 stipulates 900° C. The inorganic components in paper and paperboard generally consist of (a) mineral matter in the pulp from which the paper was made, (b) residues of chemicals used in its manufacture, (c) loading and coating materials and (d) a wide variety of mineral and other inorganic material picked up during manufacture, processing and/or use.

When the paper or paperboard contains materials which undergo only a negligible change in weight on ignition (for example, titanium dioxide), the ash content may be taken as an approximate measure of the amount of unwanted material present in the wastepaper or wasteboard, if it is known that other inorganic materials stable at 900° C. are not present. In practice, the ash content in paper or paperboard may include inorganic residue from the pulp, inorganic residues from alum used with hard water, and so on. With calcium carbonate, for example, there will be a substantial loss in weight on ignition at 900° ±25° C. The type and amount of material actually in paper waste in this case can only be estimated.

In addition to inorganic components, wastepaper may contain organic contaminants other than ink. For example, paper used to wrap newly manufactured iron and steel based products can be pretreated with various oils to protect the metal from corrosion. Such organic impurities are referred to as oily waste. The present invention removes such oily wastepaper contaminants from the waste pulp, and can also independently remove inorganic components. The laboratory process used to determine ash amount has the effect of burning off such various organic contaminants in determining ash values.

The following Table I shows some types of inorganic components used as paper additives which are removed from wastepaper by the present invention.

TABLE I

| Material | Description |
| --- | --- |
| Pigment | Titanium Dioxide |
| Talc | Magnesium Silicate |
| Zeolite | Precipitated Amorphous Sodium Alumino-silicate |
| Artificial Zeolite | Synthetic Amorphous Calcium Silicate |
| CaCO$_3$ | Calcium Carbonate |
| Filler Clay | Kaolin |
| Coating Clay | Hectorite |
| Delaminated Clay | Bentonite |
| Calcined Clay | Opacifier |

In paper reclamation processes, deinking is carried out by converting the wastepaper to a pulp and contacting the pulp with an alkaline aqueous deinking medium containing a chemical deinking agent, in order to remove ink from the pulp fiber and produce a suspension or dispersion of the ink in the aqueous medium. This medium contains, in addition to said ink, inorganic components and oily waste of the type discussed above. The resulting mixture is subsequently treated to separate the suspended ink, inorganic components and oily waste from the pulp, for example, by air sparging and flotation followed by skimming to remove the ink and other particles from the treatment bath, or by filtration and subsequent water washing.

There have been numerous attempts to improve the efficacy of conventional wastepaper treatment processes. U.S. Pat. No. 4,618,400 discloses a method for deinking wastepaper which involves converting the wastepaper to a pulp; contacting the pulp with an aqueous medium of alkaline pH containing about 0.2 to 2% by weight of a deinking agent which is a thiol ethoxylate compound; and removing suspended or dispersed ink from the pulp-containing medium.

U.S. Pat. No. 4,710,267 discloses the use of a quaternary ammonium compound to reduce the discoloration and tackiness of recycled paper. U.S. Pat. No. 5,094,716 shows the use of an ammonium salt which functions as a wetting agent to wet ink particles in a process for recycling waste newspapers.

U.S. Pat. No. 4,666,558 illustrates a deinking process which involves agitating a pulped newsprint in a aqueous medium containing an agent comprising a particular mixture of a water-soluble $C_9$ to $C_{16}$ alkanol. U.S. Pat. No. 4,935,096 describes a washing process for cellulosic fibers utilizing ionic surfactants with subsequent addition of sizing agents such as alkyl ketene dimers or alkyl succinic anhydrides.

PCT patent application WO91/14821 describes a collector chemical for wastepaper ink removal prepared by the reaction of tall oil with an amine. Japanese Pat. Publication 59-150191 describes deinking wastepaper by macerating the paper in the presence of a fatty acid salt, and then subjecting the paper to a quaternary ammonium surfactant. Soviet Union Patent 926129 provides a composition for removing printing ink from wastepapers, which contains quaternary ammonium and phosphonium surfactants, isoamyl alcohol, phosphine oxide, butyl zanthogenate, and solvent.

Japanese Patent Publication JP3119189 discloses a method of removing fibrous contaminates from the white water resulting from paper making by separately adding clay and a cation-surface-active bonding agent. The bonding agent disclosed is stearyl-trimethyl ammonium chloride. U.S. Pat. No. 4,867,844 discloses a method of treating fibrous materials, by applying an organophilic complex formed from a clay (preferably bentonite) and an organic radical derived from an onium compound preferably quaternary ammonium compound. U.S. Pat. Nos. 4,650,590 and 4,470,912 describe methods of breaking emulsions using organoclays as well as removing organic contaminants by absorption onto an organoclay matrix.

Most deinking processes do not consider the removal of inorganic components or oily waste. It is generally agreed that no completely acceptable process for treating wastepaper presently exists. The removal of water-based (flexographic) inks from wastepaper has proved to be a particularly troublesome problem associated with known flotation deinking processes. The removal of water-based inks from wastepaper using washing deinking processes also presents problems because of the use of large volumes of water and the need to treat the water so that the water can be recycled. In this regard, substantial costs are associated with processing wastepaper materials to separate water-based ink including inorganic components from those which contain oil-based inks and its associated inorganic components.

The primary consideration with any inorganic component as with any type of contaminant, is removal efficiency so that the treated product is clean, uniform, high quality, and meets new production requirements.

A secondary consideration, is the negative impact on pulp yield and sludge disposal volumes and costs. Waste treatment can therefore vary significantly from one application to another or even from one factory to a very similar factory making similar products. Wastepaper used (and specific proportions) is generally selected to balance lowest possible costs, highest yield, and obviously the removal of inks, coatings, and other additives by a particular system.

Removal of inorganic components including coating materials, as with inks, depends greatly on the type and design of the wastepaper treatment system, the specific equipment contained and associated operating characteristics and efficiencies. For example, until now the primary mechanism for removing filler clay and some coating materials has been with washing. The efficiency of washing is related primarily to particle size as well as the openness of the screen mesh on the device.

Moreover, flotation deinking treatment agents utilized to date have been ineffective in satisfactorily removing certain non-ink contaminants from wastepaper. As described above, these contaminants are frequently encountered in wastepaper deinking processes, and tend to limit the quality of the final recycled paper product.

It would therefore be highly desirable to provide a process for treating various types of wastepaper which contain water-based and/or oil-based inks to remove inorganic components and oily waste as well as such inks. In addition, it would be advantageous if such a process could also remove such contaminants from the treated wastepaper, in order to enhance the quality of paper pulp yielded by the process.

SUMMARY OF THE INVENTION

The present invention is based upon the discovery that organoclays function as highly effective wastepaper treatment agents to remove inorganic components and oily waste contaminants from wastepaper, and further that such organoclay agents may be in addition to being added directly, also may be conveniently formed in situ in an aqueous system during waste treatment. The invention comprises the use of organoclays as wastepaper treatment agents to remove inorganic components and oily waste from recycled wastepaper. Thus, the invention further provides a process for treating wastepaper, which comprises: (a) forming an organoclay agent in an aqueous wastepaper system; (b) contacting wastepaper in the aqueous system with an amount of the organoclay agent effective to remove inorganic components and oily waste from wastepaper; and (c) recovering usable paper pulp from the aqueous system. The compositions of this invention can be used to collect and remove clay, filler, other inorganic components and oily waste found in the aqueous slurry or aqueous slurry containing wastepaper by air flotation to produce paper pulp suitable for recycling, or the components of this invention may be used to remove oily waste found in the aqueous slurry or aqueous slurry containing wastepaper by washing.

Ammonium salts forming organically modified clays or organically modified clays themselves can be employed with wastepaper containing inorganic components to collect a considerable portion of said inorganic components as well as the oil-based and water-based printing ink contained therein. Such ammonium salts and organically modified clays can also be employed versus wastepaper contaminated with various types of oil to collect and remove the oily waste and produce recyclable paper pulp.

The additives of this invention can be introduced to an alkaline aqueous bath containing the wastepaper. The slurry can be subjected to shear to pulp or defiber the paper and release the ink, oily waste, clay and inorganic components into the aqueous system. The additives of this invention then collect the released contaminants. The slurry is subjected to air flotation to float the collected waste to the surface where the waste is removed by skimming or suction techniques. After removal of the contaminants, the pulp is used to make recycled paper. As a variant on the above, the pulp can be filtered from the aqueous slurry, then the additives of this invention can be added to the aqueous slurry to collect the inorganic components and oily waste, followed by removal of the contaminants from the aqueous liquid.

The additives of this invention can be added to the aqueous slurry or aqueous slurry containing wastepaper at any point in the process prior to the flotation step. Ideally, the additives of this invention are added at a stage where there will be some mixing or agitation of the pulp so as to enhance contact of the organoclay treatment agent with the inorganic component and oily waste contaminants.

The additives of this invention are compatible with chemicals such as sodium hydroxide, sodium silicate, hydrogen peroxide and chelating agents typically added at the wastepaper pulper to enhance wastepaper defibering and detachment of the ink from the fibers. The additives of this invention are also compatible with various surfactants added to increase or decrease foaming and additives to treat sticky components.

The additives of this invention will find utility in numerous areas of the paper recycling industry where it is desirable to remove ink, oily waste, and inorganic components by air flotation. For example, the ability of the additives of this invention to simultaneously remove inorganic components and deink during flotation would provide a considerable advantage over the combination flotation deinking and washing deashing process typically employed today by paper mills to produce recycled tissue paper from high ash content ledger stock. The ability of the additives of this invention to collect various types of oil would allow recycling of oily wastepaper generated, for example, from the steel and food industries.

The use of organoclays by themselves may be utilized directly in this invention. The preferred embodiments of this invention contemplate however, several means for forming the organoclay agent in situ in the aqueous pulp system. First, the organoclay may be formed in the aqueous system by adding one or more ammonium salts and one or more cation-exchangeable clays to the aqueous system, where these materials react to form the organoclay agent.

Alternatively, if some or all of the wastepaper to be treated contains cation-exchangeable clays such as bentonite, kaolinite, attapulgite, vermiculite or hectorite, the organoclay agent may be formed in the system by (a) pulping wastepaper some or all of which contains cation-exchangeable clay, to release the clay from the wastepaper; and (b) mixing at least one ammonium salt to form the organoclay treating agent by cation exchange reaction.

A third means is where both a cation-exchangeable clay and one or more ammonium salts are present in the wastepaper that is to be treated. The ammonium salt(s) may be added to the ink, paper sizing, or paper itself before the paper is printed. Then a pulping step liberates both the ammonium salt(s) and the clay contained in the wastepaper, so that they react in situ to form an organoclay.

Another technique involves adding an anhydrous mixture or blend, composed of one or more cation-exchangeable clays mixed with one or more ammonium salts, to the aqueous system. Without the presence of water the clay does not react with the ammonium salt. Upon addition of the blend to the aqueous system, the clay reacts with the salt to form the organoclay agent. In addition the ammonium salt may also react with any clay contained in the wastepaper.

A further technique involves adding the ammonium salt(s) to the ink, paper sizing, or paper itself before the paper is printed, pulping the wastepaper to liberate the ammonium salt(s), and separately adding a clay, so that the clay and ammonium salt(s) react to form the treatment agent.

In all the above means for forming the organoclay treatment agent in situ, additional amounts of clays or ammonium salts may be added to the aqueous system to enhance formation of sufficient organoclay to effectively treat the wastepaper.

An additional technique would be to add a preformed or externally prepared organoclay to the aqueous system.

The amount of ammonium salt required to prepare organoclay agents employed in a flotation process will be that amount which introduces sufficient hydrophobicity to render the organoclay floatable. The amount of ammonium salt required to prepare organoclay agents employed in a washing process will be that amount which produces organoclay which has sufficient hydrophobicity to attract the oily waste, but sufficient hydrophilicity to remain in a dispersed state. For cation-exchangeable clay the milliequivalents of amounium salt required will be approximately 20% or greater of the clay cation-exchange capacity.

Those who have handled, while reading, a magazine are likely aware of the amount of clay coating as well as the variation in the type and amount of such clay that was used in producing the magazine. Ash content can vary significantly from lightly coated (8–12%) publications to high quality, heavily coated (25–30%) publications. The type and quality of coatings can also vary between cheaper magazines and high quality magazines such as The National Review, Scientific American, Playboy and the Smithsonian. Colored financial grades, such as typical checks and business forms, and the many different types of stationery and writing papers in use, generally contain around 10% ash. This includes filler clay added to produce a smoother, higher opacity sheet, and such ash particles included are usually fairly small. Another waste grade is coated art books displayed often on coffee tables, which can easily contain 20–30% ash, mostly in the form of clay for coatings as well as pigments such as titanium dioxide.

To make various quality paper grades, complete inorganic component removal is not necessary and in fact, some remainder can be desirable for higher yield and quality. The type of inorganic component content is very important in these applications, with filler clay being best and fine coating clay being acceptable. Certain inferior waste grades having inexpensive coatings are generally not economical to be made into high quality recycled paper but can be improved by the present invention for use in lower quality recycled paper. Visible black or colored coating blotches are not acceptable. Without the improvement shown by this invention, a large proportion of heavily coated wastepaper could not be recycled without serious problems in making consistently good quality paper.

In the production of tissue paper and certain towel—quality paper, highly filled and coated furnishes are commonly used, subject to recoverability of the inorganic component particles. Tissue machines run at high speeds and require wet strength to form and handle thin sheets. The final product also needs to be soft and absorbent. High efficiency inorganic component removal is therefore desired to achieve a very reduced ash content in the final product and such efficiency is provided by the improvement described above.

Applicants have discovered that the organoclay inorganic component and oily waste removal agent may be formed in situ in the aqueous system by adding one or more ammonium salts and one or more cation-exchangeable clays to the aqueous system. Cation-exchangeable clays used in the present invention are clays that contain at least about 5 m.e.q. of exchangeable monovalent or divalent cations, such as $Na^+$, $Li^+$, $H^+$, $Ca^{2+}$, $Mg^{2+}$ or $Fe^{2+}$ per 100 grams of clay. Examples of cation-exchangeable clays include, but are not limited to, hectorite, bentonite, attapulgite, vermiculite and kaolinite. Some of the smectite type clays of the type particularly useful in this invention are described in U.S. Pat. No. 4,695,402.

Cation-exchangeable clays are commonly employed in new paper compositions to provide a smoother surface, control the penetration of inks, and improve the resistance, appearance, brightness, and opacity of papers. Cation-exchangeable clays are also applied as functional coatings, to provide such features as water resistance and pressure sensitivity. Thus, with regard to wastepapers which contain such cation-exchangeable clays, it has been discovered that an organoclay wastepaper treatment agent may be formed in situ in an aqueous system by (a) pulping a wastepaper containing a cation-exchangeable clay in the aqueous system, to release the cation-exchangeable clay from the wastepaper; and (b) mixing at least one ammonium salt with the aqueous system to form an organoclay treatment agent to remove inorganic components, oily waste as well as ink from the wastepaper.

Useful ammonium salts for purposes of the subject invention include those having the formula:

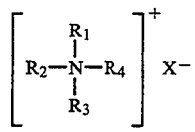

wherein $R_1$ comprises a lineal or branched aliphatic hydrocarbon group having from 1 to about 30 carbon atoms; $R_2$, $R_3$, and $R_4$ are independently selected from the group consisting of (a) lineal or branched aliphatic groups having from 1 to about 30 carbon atoms; (b) aromatic and substituted aromatic groups; (c) ethoxylated groups containing from 1 to about 80 moles of ethylene oxide; and (d) hydrogen. The anion $X^-$ which accompanies the ammonium salt is typically one that will not adversely affect the ability to cation exchange the clay with the ammonium salt. Such anions include, for example, chloride, bromide, iodide, hydroxyl, nitrite and acetate, used in an amount sufficient to satisfy the ammonium cation's charge.

The aliphatic groups in the above formula may be derived from naturally occurring oils including various vegetable oils, such as corn oil, coconut oil, soybean oil, palm oil, cottonseed oil, castor oil and the like, as well as various animal oils or fats such as tallow oil. The aliphatic groups may likewise be petrochemically derived from, for example, alpha olefins.

Useful ammonium salts for purposes of the instant invention include hydrophobic ammonium salts, such as monomethyl trialkyl quaternaries and dimethyl dialkyl quaternaries, as well as hydrophilic ammonium salts, such as water-dispersible, ethoxylated ammonium compounds, and mixtures thereof. Quaternary ammonium polymers are also useful for purposes of the instant invention.

The selection of a hydrophobic organic cation will result in organoclay that becomes hydrophobic after the ion exchange reaction. By selecting a hydrophilic organic cation, a hydrophilic organoclay results. A hydrophobic organoclay is an organoclay that can be removed from water by air sparging the organoclay/water mix then sweeping or vacuum suctioning the organoclay from the surface, a hydrophilic organoclay cannot be removed from water by this procedure.

In particular, a preferred hydrophilic ammonium salt for use in the treatment formulations of the invention for use in water washing processes comprises an ethoxylated quaternary ammonium salt that contains:
(a) at least one hydrocarbon chain having from about 8 to about 30 carbon atoms; and
(b) at least one hydrophilic carbon chain having greater than about 9 moles of ethylene oxide.

Examples of suitable ethoxylated quaternary ammonium compounds include the following: dihydrogenated tallow-methyl-[ethoxylated (33 )] ammonium chloride; hydrogenated tallow-methyl-[ethoxylated (15)] ammonium chloride; hydrogenated tallow-methyl- [ethoxylated (30)] ammonium chloride; and hydrogenated tallow-methyl-[ethoxylated (50 )] ammonium chloride.

A preferred hydrophobic ammonium salt for use in the treatment formulations of the invention for use in flotation processes comprises a quaternary ammonium salt that contains:
(a) at least one, preferably two or three, hydrocarbon chains having from about 8 to 30 carbon atoms; and
(b) either no hydrophilic carbon chains or having hydrophilic carbon chains having a total of about 9 moles of ethylene oxide or less.

Examples of suitable hydrophobic ammonium salts include the following:

Methyl trihydrogenated tallow ammonium chloride:

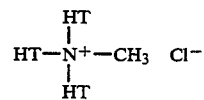

Dihydrogenated tallow-methyl-[ethoxylated (2 )] ammonium chloride:

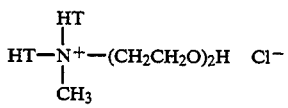

Dimethyl dihydrogenated tallow ammonium chloride:

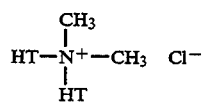

Wherein HT=Hydrogenated tallow.

It should be understood that either a mixture of hydrophobic organoclay and hydrophilic organoclay, or an organoclay in which the ammonium salt provides the resultant organoclay with the proper hydrophilic/hydrophobic balance, could be employed in the removal treatment processes that employ a combination of flotation and water washing techniques to produce treated pulp. Thus, an organoclay made from two different ammonium salts varying in their hydrophobic properties would be within the teachings of the invention. In this regard, ammonium salts having both hydrophobic and hydrophilic groups may be employed. Further, a mixture of cation-exchangeable clays having different cation exchange capacities may also be used to form the waste treatment organoclay.

The preparation of the ammonium compounds utilized in the inventive formulations can be carried out by techniques well-known in the art. For example, when preparing a quaternary ammonium salt, one skilled in the art would prepare a dialkyl secondary amine, for example, by the hydrogenation of nitriles (see U.S. Pat. No. 2,355,356), and then form the methyl dialkyl tertiary amine by reductive alkylations using formaldehyde as a source of the methyl radical. According to procedures set forth in U.S. Pat. No. 3,136,819 and U.S. Pat. No. 2,775,617, a quaternary amine halide may then be formed by adding benzyl chloride or benzyl bromide to the tertiary amine. The disclosure of the above three patents are incorporated herein by reference.

The clays which may be used in the present invention are cation-exchangeable clays having a cation-exchange capacity of at least about 5 milliequivalents per 100 grams of clay, as determined by the well-known methylene blue and ammonium acetate methods.

Cation-exchangeable clays are well-known in the art and are commercially available from a variety of sources. They may be used in the crude form, containing gangue and non-clay species, or purified by any of the well-known processes.

Representative cation-exchangeable clays useful in accordance with the present invention include bentonite, kaolinite, attapulgite, vermiculite and hectorite. It will be understood that both sheared and non-sheared forms of the above-listed cation-exchangeable clays may be employed. In addition, the cation-exchangeable clay employed can be either crude (containing gangue or non-clay material) or beneficiated (gangue removed). The ability to use crude clay in the cation-exchangeable clay compositions of this invention represents a substantial cost savings, since the clay benefication process and conversion to the sodium form do not have to be carried out.

The treatment process provided by the invention may utilize either or both hydrophilic and hydrophobic organoclays as wastepaper treatment agents. Typically, relatively hydrophilic organoclays will find their greater utility in systems which employ water washing to remove oily waste. Relatively hydrophobic organoclays will find their greatest utility in systems that employ flotation to remove inorganic components and oily waste.

An advantage of the in situ formation of the inorganic component and oily waste removal agent over use of a preformed organoclay is that it does not have to be filtered, washed, dried, or ground prior to addition. Also, the organoclay is formed in a highly dispersed state, which aids treatment efficiency, and allows the use of ammonium salt/cation exchangeable clay combinations that if employed to prepare preformed organoclays could not be readily dispersed in the pulping unit. Thus, the in situ method allows for a broader range of ammonium salts and cation exchangeable clays to be employed, along with cost savings due to lower raw material prices.

When clay is added to the system to be treated the clay can be added in dry or predispersed form. Optionally, the aqueous clay slurry may be centrifuged before addition to remove impurities. The slurry may also be sheared before addition, to increase the dispersion of the clay before in situ formed organoclay formation.

The recovery of paper pulp according to the process of the invention is preferably achieved by either floatation and/or water washing techniques well-known in the art. When the inventive technique is carried out as a flotation process, the treatment agent collects the contaminants released from the wastepaper, followed by air flotation and skimming of the contaminants to remove the same from the aqueous slurry. The operation is preferably carried out under alkaline conditions. The aqueous system may include one or more foaming agents, such as soaps or detergents, and surfactants, in order to yield enhanced performance.

When the inventive technique is carried out as a water washing process, the slurry is optionally treated to physically remove the relatively small amount of foam which may collect on the surface, then filtered and the resulting fiber mat subjected to multiple water washings so that dispersed particles pass through the mat. The treatment agent also functions to disperse the particles to a size small enough so that on filtration the oily waste can be removed by rinsing through the fiber mat. The operation is again preferably carried out under alkaline conditions.

Exemplary types of wastepapers which may be treated according to the invention are newspaper, magazines, ledgers, computer paper, book stock, and mixtures of these materials. Foodboard, semi-bleached sulfite, printed bleached kraft, cigarette carton stock, and other similar grades are also occasionally used in wastepaper recycling. Wastes typically contain high brightness fibers that are heavily coated to provide the finishes used on many packages in supermarkets. These coatings break up to one degree or another by mechanical forces in a wastepaper process and exist as visible and sub-visible particles in the pulp. Because of their size, removal is primarily by flotation. It should be noted that ink removal may depend on removal of these coatings. Since ink is printed on the coating, it will not be removed unless the coating particles are removed.

The wastepaper is pulped in order to increase the surface area of the wastepaper in contact with the treating agent of the invention. Further, as discussed above, pulping of wastepapers containing cation-exchangeable clays has been found to release the clays into the aqueous system, where the clays may then react with an ammonium salt to form an organoclay treating agent. Similarly, the agent may be formed in situ by pulping wastepaper containing both a cation-exchangeable clay and an ammonium salt, or by pulping a wastepaper containing an ammonium salt and separately adding a cation-exchangeable clay to the aqueous system. Techniques and apparatus for palping wastepaper are well-known to those having ordinary skill in the art. For example, the wastepaper may be pulped after addition to the aqueous system by subjecting the system to shear.

The process of the instant invention provides an effective means for treating wastepaper containing water-based and/or oil-based inks to remove inorganic components and oily waste. The inventive process results in paper pulp that can be suitable for the manufacture of high quality recycled paper products. In addition, the treated paper pulp yielded by the present invention contains less contaminants than the products of conventional techniques.

The inventive process described herein, carried out by the flotation process, is operative with wastepaper stock containing only inorganic components or wastepaper stock containing only oily waste or wastepaper stock containing inorganic components and oily waste.

The following examples are given to illustrate the invention, but are not deemed to be limiting thereof. All percentages given throughout the specification are based upon weight, 100% weight basis, unless otherwise indicated.

EXAMPLE 1

This example illustrates the use of several preferred ammonium salts and a preferred externally prepared organoclay to remove inorganic components by a flotation process.

Ammonium salts, employed to form organoclay in situ by reaction with cation-exchangeable clay released from the wastepaper on pulping, included dimethyl dihydrogenated tallow ammonium chloride (2M2HT), dihydrogenated tallow-methyl-ethoxylated (2) ammonium chloride (M2HT-2 E. O. ), benzyl methyl dihydrogenated tallow ammonium chloride (BM2HT) and methyl trihydrogenated tallow ammonium chloride (M3HT). 2M2HT, BM2HT and M3HT were employed in conjunction with 4.5% Brij 700 surfactant (percentage based on weight of ammonium salt), the Brij 700 being employed to enhance foaming. The externally prepared organoclay was prepared by reacting 130 milliequivalents (m.e.) M3HT with an aqueous slurry of crude hectorite clay. M. E. ratio is based on 100 g crude clay. The organoclay slurry was reacted 30 minutes at 65° C. after which a loading of 1.5% Brij 700 surfactant (percentage based on weight of organoclay solids) was added. For comparison, standard fatty acid soap collector was also evaluated. The wastepaper mix employed in the experiments of this example was composed of 35%/35%/30% flexographic ink printed news/oil-based ink printed news/magazine.

In the testing, wastepaper was pulped at a 4% concentration in warm water containing 0.16% diethylene-triaminepentaacetic acid, 3% sodium silicate solution, 1% sodium hydroxide, 1% hydrogen peroxide and the ammonium salt or organoclay additive (percentages based on weight of the wastepaper). The paper was pulped for 10 minutes in a Maelstrom laboratory pulper. After pulping, the paper was diluted to 1% with warm water, transferred to a 5 liter laboratory flotation cell and subjected to air flotation. Vacuum suction techniques were employed to remove the floated waste from the pulp surface. Pulp samples for brightness and ash content were collected at 0 and 18 minutes into the flotation step. Pulp samples were acidified to pH 4.5, filtered, pressed, dried and the blue reflectance of the pad measured using a Hunterlab device. Blue reflectance values were employed as a measure of paper brightness. The ash content of the pads was determined according to Tappi method T 211 om-85 (pad dried at 100° C. then ignited at 575° C. for 3 hours). Data are presented in Table 2.

TABLE 2

| ADDITIVE | BRIGHTNESS (TOP/BOTTOM) | | ASH CONTENT | |
|---|---|---|---|---|
| | 0 MIN. | 18 MIN. | 0 MIN. | 18 MIN. |
| A | 45.2/43.5 | 64.2/61.9 | 7.2% | 1.1% |
| B | 48.8/45.3 | 64.1/60.8 | 7.2% | 1.4% |
| C | 48.1/42.9 | 63.7/62.7 | 7.2% | 1.2% |
| D | 45.3/42.4 | 61.9/54.0 | 7.2% | 1.7% |
| E | 44.7/46.4 | 63.1/62.0 | 8.7% | 1.3% |
| F | 46.6/31.2 | 49.4/44.0 | 8.3% | 5.5% | wherein:
A = 1.0% 2M2HT with surfactant
B = 1.0% M2HT - 2 E.O.
C = 1.0% BM2HT with surfactant
D = 1.0% M3HT with surfactant
E = 3.0% 130 M.E. M3HT/crude hectorite organoclay with 1.5% surfactant
F = 1.0% oleic acid with 1.5% Ca(OH)$_2$ - fatty acid soap The data demonstrate that the additives of this invention effectively collect and remove by air flotation contaminants including inks, clay, filler, and other inorganic components. Although significant brightness gains accompanied by approximately a 75%–85% reduction in pulp ash content were obtained for the ammonium salt and organoclay compositions of this invention, the inorganic component removal aspect of our invention does not need ink to be present to be operative.

EXAMPLE 2

This example illustrates the use of preferred organoclay compositions, including organoclays synthesized externally and generated in situ, to remove oily waste from paper using a flotation process.

An organoclay was prepared externally by reacting 130 m.e. M3HT with an aqueous slurry of crude hectorite clay. The organoclay slurry was reacted 30 minutes at 65° C. after which a loading of 1.5% Brij 700 surfactant (percentage based on weight of organoclay solids) employed to enhance foaming was added.

A second organoclay was prepared externally by reacting 75 m.e. M3HT with an aqueous slurry of crude hectorite clay. The organoclay slurry was reacted 30 minutes at 65° C.

A third organoclay was prepared externally by reacting 120 m.e. M3HT with an aqueous slurry of crude hectorite clay. The organoclay slurry was reacted 30 minutes at 65° C.

Two organoclays were generated in situ by (1) separately adding M3HT and crude hectorite clay to the aqueous system and (2) adding M3HT to the aqueous system and reacting the M3HT with cation-exchangeable clay released from the wastepaper on pulping.

All organoclays were employed in conjunction with 1.5% Brij 700 surfactant (percentage based on weight of organoclay) to enhance foaming properties.

The wastepaper employed included (1) oily steel mill kraft containing 19.4% of a long chain aliphatic hydrocarbon, (2) brown paper with 15% soya oil and (3) brown paper with 15% castor oil.

In the testing, oil contaminated wastepaper was placed in warm water containing 3% sodium silicate solution, 1% sodium hydroxide, 1% hydrogen peroxide and the inventive compositions (percentage based on oily paper weight). The samples were pulped using the Waring Blender, subjected to air flotation and any oily waste scum that reached the surface was removed by vacuum suction. After flotation, the treated pulp was filtered and dried. Samples of the dried pulp were extracted with methylene chloride to quantitate the residual oil. Date are presented in Table 3.

TABLE 3

| OIL COLLECTOR | WASTEPAPER | % RESIDUAL OIL | % OIL REMOVED |
|---|---|---|---|
| G | OILY STEEL KRAFT | 4.7% | 75.8% |
| H | OILY STEEL KRAFT | 4.7% | 75.8% |
| I | OILY STEEL KRAFT | 5.0% | 74.2% |
| J | OILY STEEL KRAFT | 5.7% | 70.6% |
| K | OILY STEEL KRAFT | 9.5% | 51.0% |
| G | 15% SOYA OIL/BROWN PAPER | 3.7% | 75.3% |
| G | 15% CASTOR OIL/BROWN PAPER | 4.4% | 70.7% | wherein:
G = 3% 130 m.e. M3HT/crude hectorite externally prepared organoclay with 1.5% surfactant.
H = 1% 75 m.e. M3HT/crude hectorite externally prepared organoclay with surfactant.
I = 1% 120 m.e. M3HT/crude hectorite externally prepared organoclay with surfactant.
J = 1.5% M3HT and 1.5.% crude hectorite added separately to form organoclay in situ with surfactant.
K = 1.5% M3HT reacted with clay released from wastepaper to form organoclay in situ with surfactant.

The above demonstrates that externally generated organoclays and organoclays generated in situ can be employed to collect and remove by air flotation a significant proportion of oil contaminants contained on wastepaper. The organoclays are effective collectors of various types of oil.

EXAMPLE 3

This example illustrates the use of preferred in situ generated organoclays composed of various ammonium salts and cation-exchangeable clays to remove oily waste from paper using a flotation process.

The ammonium salts employed to prepare in situ generated organoclays included 2M2HT, M3HT, trimethyl coco ammonium chloride (3MC) and dimethyl dicoco ammonium chloride (2M2C). The cation-exchangeable clays included crude hectorite, kaolinite, attapulgite and bentonite. The wastepaper employed in this example was oily steel mill kraft containing 19.4% of a long chain aliphatic hydrocarbon.

In the testing, oily wastepaper was added to warm water containing 3% sodium silicate solution, 1% sodium hydroxide, 1% hydrogen peroxide and the ammonium salt and cation-exchangeable clay components (percentages based on wastepaper weight). For comparison, a blank in which no ammonium salt or cation-exchangeable clay were introduced was also evaluated. A 1.5% loading of Brij 700 surfactant (percentage based on weight of in situ generated organoclay) was added to enhance foaming properties. The samples were pulped using the Waring Blender, subjected to air flotation and any oily waste scum that reached the surface was removed by vacuum suction. After flotation, the treated pulp was filtered and dried. Samples of the dried pulp were extracted with methylene chloride to quantitate the residual oil. Data are presented in Table 4.

TABLE 4

| OIL COLLECTOR | % RESIDUAL OIL | % OIL REMOVED |
|---|---|---|
| L | 10.1% | 47.9% |
| M | 6.3% | 67.5% |
| N | 3.3% | 83.0% |
| O | 5.7% | 70.6% |
| P | 5.4% | 72.2% |
| Q | 3.8% | 80.4% |
| R | 6.2% | 68.0% |
| S | 14.0% | 27.8% | wherein:
L = 1.5% 3MC and 1.5% crude hectorite added separately to form organoclay in situ.
M = 1.5% 2M2C and 1.5% crude hectorite added separately to form organoclay in situ.
N = 1.5% 2M2HT and 1.5% crude hectorite added separately to form organoclay in situ.
O = 1.5% M3HT and 1.5% crude hectorite added separately to form organoclay in situ.
P = 1.5% M3HT and 1.5% kaolinite added separately to form organoclay in situ.
Q = 1.5% M3HT and 1.5% attapulgite added separately to form organoclay in situ.
R = 1.5% M3HT and 0.75% bentonite added separately to form organoclay in situ.
S = Blank, no ammonium salt or cation-exchangeable clay. (L-R with surfactant)

The successful collection and removal by air flotation of a significant proportion of oily waste contaminants contained on wastepaper using in situ generated organoclays composed of various ammonium salts and cation-exchangeable clays is shown by this result. Without the presence of an in situ generated organoclay, only a relatively small amount of oily waste is removed.

EXAMPLE 4

This example further illustrates the use of an in situ generated organoclay to remove inorganic components from wastepaper using a flotation process.

A 1% loading of 2M2HT (percentage based on wastepaper weight) was employed in conjunction with 1.5% Brij 700 surfactant (percentage based on M2HT weight) and 0.2% crude hectorite clay (percentage based on wastepaper weight). The wastepaper mix, pulping conditions and flotation conditions were the same as that described in Example 1. Pulp samples for brightness and ash content were collected at 0 and 12 minutes into the flotation step. Pulp samples were acidified to pH 5, filtered, pressed, dried and the blue reflectance of the pad measured using a Hunterlab device. The blue reflectance values were employed as a measure of paper brightness. The ash content of the pads was determined according to Tappi method T211 om-85. Data are presented in Table 5.

TABLE 5

| ADDITIVE | BRIGHTNESS (TOP/BOTTOM) | | ASH CONTENT | |
|---|---|---|---|---|
| | 0 MIN | 12 MIN. | 0 MIN. | 12 MIN. |
| T | 42.8/44.0 | 60.5/59.5 | 8.2% | 2.2% | wherein:
T = 1.0% 2M2HT with surfactant and 0.2% crude hectorite clay.

The data demonstrate that the additives of this invention effectively collect and remove by air flotation contaminants including inks, clay, filler and other inorganic components.

The invention thus being described, it will be obvious that the same may be modified in several ways. Such changes are not to be regarded as a departure from the spirit of the invention and such modifications are intended to be included within the scope of the below claims.

What is claimed is:

1. A process for treating wastepaper containing oily waste contaminants to remove oily waste contaminants which comprises:
   (a) forming an organoclay in situ in a wastepaper containing oily waste contaminants aqueous system by reacting one or more cation exchangeable clays having a cation exchange capacity of at least 5 milliequivalents per 100 grams of clay with one or more ammonium salts;
   b) contacting the wastepaper aqueous system with an amount of the organoclay effective to remove the oily waste contaminants from the wastepaper; and
   (c) recovering paper pulp from said aqueous system.

2. The process of claim 1, wherein the organoclay is formed in said aqueous system by adding one or more of said cation-exchangeable clays and one or more of said ammonium salts to the aqueous system.

3. The process of claim 1, wherein the organoclay is formed in said aqueous system by (a) pulping wastepaper containing one or more of said cation-exchangeable clays; and (b) mixing one or more of said ammonium salts with the aqueous system to form the organoclay.

4. The process of claim 1 wherein the organoclay is formed in said aqueous system by adding to said aqueous system an anhydrous blend consisting of one or more of said cation-exchangeable clays and one or more of said ammonium salts.

5. The process of claim 1, wherein the organoclay is formed in said aqueous system by pulping wastepaper containing one or more of said cation-exchangeable clays and one or more of said ammonium salts.

6. The process of claim 1, wherein the organoclay is formed in said aqueous system by (a) pulping wastepaper containing one or more of said ammonium salts; and (b) mixing one or more of said cation-exchangeable clays with the aqueous system to form an organoclay.

7. The process of claim 1, wherein the recovering step includes air sparging in order to float the oily waste contaminants removed from the wastepaper to the surface of said aqueous system, then collecting the paper pulp.

8. The process of claim 1, wherein the organoclay comprises a reaction product of:
   (a) said cation-exchangeable clay or clays; and
   (b) one or more of said ammonium salts in an amount of from about 20% or greater of the cation exchange capacity of said cation-exchangeable clay or clays.

9. The process of claim 1, wherein the organoclay comprises a mixture of at least one hydrophobic organoclay with at least one hydrophilic organoclay.

10. The process of claim 1, wherein the organoclay comprises a reaction product of (a) a mixture of at least two different of said cation-exchangeable clays; and (b) one or more of said ammonium salts.

11. The process of claim 1, wherein the organoclay comprises a reaction product of (a) one or more of said cation exchangeable clays; and (b) one or more of said ammonium salts wherein said ammonium salt or salts has both hydrophobic and hydrophilic groups.

12. The process of claim 1, wherein the organoclay comprises a reaction product of one or more of said cation-exchangeable clays and methyl trihydrogenated tallow ammonium chloride.

13. The process of claim 1, wherein the recovery step includes water washing the paper pulp.

14. The process of claim 1, wherein the organoclay comprises a reaction product of an ethoxylated quaternary ammonium chloride salt and one or more of said cation-exchangeable clays.

15. The process of claim 1, wherein the organoclay is a reaction product of (a) one or more of said cation-exchangeable clays selected from the group consisting of crude hectorite, crude bentonite, beneficiated hectorite, beneficiated bentonite, spray dried hectorite, saponite, attapulgite, kaolinite, vermiculite and mixtures thereof; and (b) one or more of said ammonium salts.

16. The process of claim 1, wherein the organoclay is a reaction product of (a) one or more of said cation-exchangeable clays; and (b) one or more of said ammonium salts having the formula:

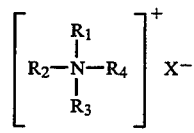

wherein $R_1$ comprises a lineal or branched aliphatic hydrocarbon group having from 1 to about 30 carbon atoms; $R_2$, $R_3$ and $R_4$ are independently selected from the group consisting of (a) lineal or branched aliphatic groups having from 1 to about 30 carbon atoms; (b) aromatic and substituted aromatic groups; (c) ethoxylated groups containing from 1 to about 80 moles of ethylene oxide; and (d) hydrogen.

17. The process of claim 1 comprising the additional step of removing printing ink from the wastepaper by contacting the wastepaper aqueous system with an amount of organoclay effective to remove such printing ink.

18. A process for treating wastepaper containing inorganic components to remove inorganic components which comprises:
   (a) forming an organoclay, in situ in a wastepaper containing inorganic components aqueous system by reacting one or more cation exchange clays having a cation exchange capacity of 5 milliequivilants per 100 grams of clay with one or more ammonium salts;
   (b) contacting the wastepaper aqueous system with an amount of the organoclay effective to remove the inorganic components from the wastepaper; and
   (c) recovering paper pulp from said aqueous system.

19. The process of claim 18, wherein the organoclay is formed in said aqueous system by adding one or more of said cation-exchangeable clays and one or more of said, ammonium salts to said aqueous system.

20. The process of claim 18, wherein the organoclay is formed in said aqueous system by (a) pulping wastepaper containing one or more of said cation-exchangeable clays; and (b) mixing one or more of said ammonium salts with said aqueous system to form the organoclay.

21. The process of claim 18 wherein the organoclay is formed in said aqueous system by adding to said aqueous system an anhydrous blend consisting of one or more of said cation-exchangeable clays and one or more of said ammonium salts.

22. The process of claim 18, wherein the organoclay is formed in said aqueous system by pulping wastepaper containing one or more of said cation-exchangeable clays and one or more of said ammonium salts.

23. The process of claim 18, wherein the organoclay is formed in said aqueous system by (a) pulping wastepaper containing one or more of said ammonium salts; and (b) mixing one or more of said cation-exchangeable clays with the aqueous system to form an organoclay.

24. The process of claim 18, wherein the recovering step includes air sparging in order to float the inorganic components removed from the wastepaper to the surface of said aqueous system, and then recovering the paper pulp.

25. The process of claim 18, comprising the additional step of removing printing ink from the wastepaper by contacting the wastepaper aqueous system with an amount of organoclay effective to remove such printing ink.

26. The process of claim 18 wherein the organoclay comprises a reaction product of:
(a) said cation-exchangeable clay or clays; and
(b) one or more said ammonium salts in an amount of from about 20% or greater of the cation exchange capacity of the cation-exchangeable clay or clays.

27. The process of claim 18, wherein the organoclay comprises a reaction product of (a) a mixture of at least two different of said cation-exchangeable clays; and (b) one or more of said ammonium salts.

28. The process of claim 18, wherein the organoclay comprises a reaction product of one or more of said cation-exchangeable clays and methyl trihydrogenated tallow ammonium chloride.

29. The process of claim 13, wherein the organoclay comprises a reaction product of one or more of said cation-exchangeable clays and dimethyl dihydrogenated ammonium chloride.

30. The process of claim 18, wherein the organclay comprises a reaction product of one or more of said cation-exchangeable clays and dimethyl dihydrogenated tallow ammonium chloride.

31. The process of claim 18, wherein the organoclay is a reaction product of (a) one or more of said cation-exchangeable clays selected from the group consisting of crude hectorite, crude bentonite, beneficiated hectorite, beneficiated bentonite, spray dried hectorite, saponite, attapulgite, kaolinite, vermiculite and mixtures thereof; and (b) one or more of said ammonium salts.

32. The process of claim 18, wherein the organoclay is a reaction product of (a) one or more of said cation-exchangeable clays; and (b) one or more of said ammonium salts having the formula:

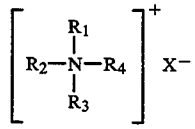

wherein $R_1$ comprises a lineal or branched aliphatic hydrocarbon group having from 1 to about 30 carbon atoms; $R_2$, $R_3$ and $R_4$ are independently selected from the group consisting of (a) lineal or branched aliphatic groups having from 1 to about 30 carbon atoms; (b) aromatic and substituted aromatic groups; (c) ethoxylated groups containing from 1 to about 80 moles of ethylene oxide; and (d) hydrogen.

* * * * *